(12) United States Patent
Nakamura et al.

(10) Patent No.: US 8,944,494 B2
(45) Date of Patent: Feb. 3, 2015

(54) SIDE VEHICLE-BODY STRUCTURE OF VEHICLE

(71) Applicant: Mazda Motor Corporation, Hiroshima (JP)

(72) Inventors: Takeshi Nakamura, Hiroshima (JP); Junko Nitta, Hatsukaishi (JP); Seiji Nakano, Higashihiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 13/958,251

(22) Filed: Aug. 2, 2013

(65) Prior Publication Data

US 2014/0054927 A1    Feb. 27, 2014

(30) Foreign Application Priority Data

Aug. 23, 2012   (JP) ................................. 2012-183829

(51) Int. Cl.
*B62D 25/00* (2006.01)
*B62D 25/04* (2006.01)
*B62D 25/06* (2006.01)

(52) U.S. Cl.
CPC ................ *B62D 25/04* (2013.01); *B62D 25/06* (2013.01)
USPC .................................. 296/193.06; 296/187.12

(58) Field of Classification Search
USPC .............. 296/193.06, 203.03, 29, 30, 193.05, 296/187.12
See application file for complete search history.

(56) References Cited

U.S. PATENT DOCUMENTS

2012/0153676 A1 *   6/2012   Shono ..................... 296/193.06

FOREIGN PATENT DOCUMENTS

JP    2009-057032 A    3/2009

\* cited by examiner

*Primary Examiner* — Joseph D Pape
(74) *Attorney, Agent, or Firm* — Studebaker & Brackett PC

(57) ABSTRACT

A load transmission portion which projects toward a roof rail outer panel is provided at a position between the roof rail outer panel and a roof rail inner panel which is located substantially at the same longitudinal-position as an upper end of a pillar outer panel. Accordingly, a center pillar can be properly restrained from coming into a vehicle compartment, restraining any improper increase of the number of components.

20 Claims, 11 Drawing Sheets

SIDE VEHICLE-BODY STRUCTURE OF VEHICLE

BACKGROUND OF THE INVENTION

The present invention relates to a side vehicle-body structure of a vehicle which transmits and disperses a collision load applied to a center pillar from the vehicle side, for example, to a roof rail.

Conventionally, it has been an issue from viewpoints of secure protection of passengers in a vehicle compartment how to properly restrain a center pillar from coming into the vehicle compartment when another vehicle collides with a vehicle side portion or the vehicle side portion hits against an obstacle in a side vehicle-body structure of a vehicle comprising a pair of right-and-left roof rails extending in a vehicle longitudinal direction at an upper portion of a vehicle body, a roof reinforcement connecting the roof rails in a vehicle width direction, a pair of right-and-left side sills extending in the vehicle longitudinal direction at a lower portion of the vehicle body, and a center pillar connecting each of the roof rails and each of the side sills. Various structures to solve this issue have been proposed up to now.

A vehicle-body upper structure (corresponding to the side vehicle-body structure according to the present application) disclosed in Japanese Patent Laid-Open Publication No. 2009-57032, for example, shows a structure in which a reinforcing pipe having a specified length is joined inside and along a roof side rail. According to this vehicle-body upper structure disclosed in the patent document, the reinforcing pipe restrains the roof side rail from bending toward the inside of a vehicle compartment when a collision load is applied to a center pillar, and also the collision load is transmitted and dispersed to a roof arch (corresponding to a roof reinforcement according to the present application), so that the center pillar is restrained from coming into the vehicle compartment.

The above-described vehicle-body upper structure disclosed in the patent document, however, has a problem in that the number of components, such as the reinforcing pipe and parts for joining and fixing the reinforcing pipe to the roof side rail, may improperly increase, so that the weight of the entire vehicle may become heavier.

SUMMARY OF THE INVENTION

The present invention has been devised in view of the above-described problem, and an object of the present invention is to provide a side vehicle-body structure of a vehicle which can properly restrain the center pillar from coming into the vehicle compartment as well as any improper increase of the number of components.

According to the present invention, there is provided a side vehicle-body structure of a vehicle, comprising a pair of right-and-left roof rails extending in a vehicle longitudinal direction at an upper portion of a vehicle body, each of the roof rails being formed integrally by a roof rail outer portion provided on an outward side and a roof rail inner portion provided on an inward side, a roof reinforcement extending in a vehicle width direction and connecting the pair of right-and-left roof rails, a pair of right-and-left side sills extending in the vehicle longitudinal direction at a lower portion of the vehicle body, and a center pillar connecting a central portion, in the vehicle longitudinal direction, of each of the roof rails and a central portion, in the vehicle longitudinal direction, of each of the side sills, the center pillar being formed integrally by a pillar outer portion which is connected to the roof rail outer portion of the roof rail at an upper end thereof and a pillar inner portion which is connected to the roof rail inner portion of the roof rail at an upper end thereof, wherein a load transmission portion is provided at a position between the roof rail outer portion and the roof rail inner portion which is located substantially at the same longitudinal-position as the upper end of the pillar outer portion, an upper end of the load transmission portion being connected to an outward face of the roof rail inner portion, a lower end of the load transmission portion being connected to the upper end of the pillar inner portion and/or the outward face of the roof rail inner portion, the load transmission portion being configured to project outward toward the roof rail outer portion.

According to the present invention, the side vehicle-body structure of a vehicle can properly restrain the center pillar from coming into the vehicle compartment as well as any improper increase of the number of components. Specifically, the pillar outer portion presses the roof rail outer portion toward the inside of the vehicle compartment in accordance with deformation of the pillar outer portion which occurs inward, i.e., toward the inside of the vehicle compartment, due to the collision load, so that the roof rail outer portion starts its deforming toward the roof rail inner portion.

Herein, since the load transmission portion projects toward the roof rail outer portion, the roof rail outer portion can contact the load transmission portion at an initial stage of the deformation. Accordingly, the side vehicle-body structure of a vehicle can transmit the collision load from the roof rail outer portion to the roof reinforcement via the load transmission portion and the roof rail inner portion.

Thereby, the collision load which increases in accordance with progress of the collision is transmitted to the roof reinforcement early, so that the deformation of the roof rail toward the inside of the vehicle compartment due to the collision load can be restrained. That is, it can be restrained that the center pillar comes into the vehicle compartment in accordance with the deformation of the roof rail toward the inside of the vehicle compartment. Additionally, since the side vehicle-body structure of a vehicle can achieve the early transmission and dispersion of the collision load together with restraining any improper increase of the number of components by means of the load transmission portion, the weight increase of the entire vehicle can be restrained.

Further, since the center pillar is comprised of the pillar inner portion and the pillar outer portion, the side vehicle-body structure of a vehicle can transmit the collision load from the pillar outer portion to the roof reinforcement via the roof rail outer portion at the initial stage before the starting of deformation of the pillar outer portion, and also transmit and disperse the collision load from the pillar outer portion to the roof reinforcement via the pillar inner portion and the roof rail inner portion.

Thereby, the side vehicle-body structure of a vehicle can transmit and disperse the collision load to the roof reinforcement in order from the initial stage of collision. That is, the side vehicle-body structure of a vehicle establishes plural transmission paths for the transmission and dispersion of the collision load in accordance with the progress of collision, so that the deformation of the roof rail into the vehicle compartment can be restrained. Accordingly, the side vehicle-body structure of a vehicle can restrain the center pillar from coming into the vehicle compartment, restraining any improper increase of the number of components.

According to an embodiment of the present invention, the upper end of the pillar outer portion is connected to the roof rail outer portion substantially at the same position as an upper portion of the load transmission portion. Thereby, the side vehicle-body structure of a vehicle can surely transmit the collision load to the load transmission portion. Specifically, there is a concern that in a case in which the upper end of the pillar outer portion is connected to the roof rail outer portion at a position below the load transmission portion, deformation of the roof rail outer portion relative to the load transmission portion may become unstable, so that the transmission efficiency of the collision load between the pillar outer portion and the load transmission portion may not be stable. By contrast, since the upper end of the pillar outer portion is connected to the roof rail outer portion substantially at the same position as the upper portion of the load transmission portion according to the present embodiment, the side vehicle-body structure of a vehicle can enlarge the overlapping area of the pillar outer portion with the roof rail outer portion. Accordingly, the pillar outer portion can surely press the roof rail outer portion so that a range of the roof rail outer portion facing the load transmission portion can be uniformly crushed toward the inside of the vehicle compartment. Thereby, the roof rail outer portion contacts the load transmission portion surely, so that the collision load can be more efficiently transmitted to the load transmission portion. Accordingly, the side vehicle-body structure of a vehicle can more surely transmit the collision load transmitted to the roof rail outer portion to the load transmission portion. Thereby, the side vehicle-body structure of a vehicle can restrain the deformation of the roof rail toward the inside of the vehicle compartment. Accordingly, the side vehicle-body structure of a vehicle can restrain the center pillar from coming into the vehicle compartment by surely transmitting the collision load from the roof rail outer portion to the load transmission portion.

According to another embodiment of the present invention, the load transmission portion has a base portion thereof positioned on a side of the roof rail inner portion and is configured to project outward toward the roof rail outer portion so as to have substantially a hat-shaped cross section, and a projection portion which projects inward and extends in the vehicle longitudinal direction is provided at a portion of the roof rail inner portion which is located near the base portion of the load transmission portion. Herein, the above-described base portion can be formed at either an upper end or a lower end of the load transmission portion, or at the both. The above-described projection portion can be formed in a bead shape, a ridgeline shape or the like. The side vehicle-body structure of a vehicle according to the present embodiment can increase the rigidity of a portion of the roof rail inner portion near the base portion of the load transmission portion. Thereby, deformation of the roof rail inner portion toward the inside of the vehicle compartment against pressing of the base portion of the load transmission portion can be restrained. Accordingly, the side vehicle-body structure of a vehicle can properly restrain the center pillar from coming into the vehicle compartment by increasing the rigidity of the portion of the roof rail inner portion near the base portion of the load transmission portion.

According to another embodiment of the present invention, the roof reinforcement is connected to the roof rail at substantially at the same longitudinal-position as an upper end of the center pillar, and a roof gusset which connects the roof reinforcement and the center pillar is provided, a lower end of the roof gusset being connected to the roof rail inner portion substantially at the same position as a lower end of the load transmission portion. The side vehicle-body structure of a vehicle according to the present embodiment can transmit the collision load from the lower end of the load transmission portion to the roof gusset via the roof rail inner portion and also transmit the collision load from the roof gusset to the roof reinforcement. Further, since the roof gusset is provided, the side vehicle-body structure of a vehicle can strengthen the connection of the roof rail and the roof reinforcement and transmit and disperse the collision load applied to the center pillar to the roof reinforcement directly. Additionally, the rigidity of a portion of the roof rail inner portion near the lower end of the load transmission portion can be increased. Thereby, the side vehicle-body structure of a vehicle can reduce the collision load transmitted to the roof rail, thereby properly restraining the roof rail from deforming toward the inside of the vehicle compartment. Accordingly, the side vehicle-body structure of a vehicle can properly restrain the center pillar from coming into the vehicle compartment by reducing the collision load transmitted to the roof rail via the roof gusset.

According to another embodiment of the present invention, the pillar inner portion and the load transmission portion are formed separately from each other, the load transmission portion is configured to have substantially a hat-shaped cross section and upper and lower base portions thereof, the upper and lower base portions of the load transmission portion being connected to the roof rail inner portion. According to the present embodiment, since no load transmission portion is formed at the pillar inner portion, a panel material to make the pillar inner portion can be used efficiently. Further, since the load transmission portion is made of a panel material having a simple shape, the panel material of the pillar inner portion can be used efficiently as well. Additionally, since the other panel than the pillar inner portion is formed to have substantially the hat-shaped cross section through pressing, no die for pressing may be necessary, so that the productivity may improve.

According to another embodiment of the present invention, the roof reinforcement is connected to the roof rail at substantially at the same longitudinal-position as an upper end of the center pillar, a roof gusset which connects the roof reinforcement and the center pillar is provided, and three members of the lower base portion of the load transmission portion, the roof rail inner portion, and a lower end of the roof gusset are overlapped and joined together. The side vehicle-body structure of a vehicle according to the present embodiment can smoothly transmit the collision load from the lower base portion of the load transmission portion to the roof gusset via the roof rail inner portion, and then to the roof reinforcement by way of the roof gusset. Further, since the roof gusset is provided, the side vehicle-body structure of a vehicle can strengthen the connection of the roof rail and the roof reinforcement and transmit and disperse the collision load applied to the center pillar to the roof reinforcement directly. Additionally, the rigidity of the portion of the roof rail inner portion near the lower end of the load transmission portion can be increased. Thereby, the side vehicle-body structure of a vehicle can reduce the collision load transmitted to the roof rail, thereby properly restraining the roof rail from deforming toward the inside of the vehicle compartment. Accordingly, the side vehicle-body structure of a vehicle can properly restrain the center pillar from coming into the vehicle compartment by reducing the collision load transmitted to the roof rail via the roof gusset.

According to another embodiment of the present invention, a corner portion of the load transmission portion which is formed between the lower base portion and a side wall portion extending outward from the lower base portion and a corner portion of the roof gusset which is formed between the lower end of the roof gusset and a gusset slant portion extending obliquely inward and upward toward the roof reinforcement from the lower end are arranged at the same level in a vehicle vertical direction. According to the present embodiment, the load transmission from the side wall portion of the load transmission to the gusset slant portion of the roof gusset can be made properly smooth. Accordingly, the collision load can be smoothly transmitted from the lower base portion of the load transmission portion to the roof gusset via the roof rail inner portion, and then to the roof reinforcement.

According to another embodiment of the present invention, protrusion portions which protrude in a vehicle vertical direction are formed at part of corner portions of the load transmission portion which are formed between the base portions and side wall portions extending outward from the base portions. According to the present embodiment, the strength of the load transmission portion can be increased by the protrusion portions. In general, in a case in which the above-described corner portion is formed through pressing of the load transmission portion, a so-called spring back (i.e., recovering to an original flat-face shape due to a panel's elasticity) may happen. However, since the protrusion portions are formed in the present embodiment, the spring back after pressing can be restrained properly, thereby improving the forming of shapes.

Other features, aspects, and advantages of the present invention will become apparent from the following description which refers to the accompanying drawings.

DETAILED DESCRIPTION OF THE INVENTION

Hereafter, preferred embodiments of the present embodiment will be described referring to the accompanying drawings.

Figure 1:
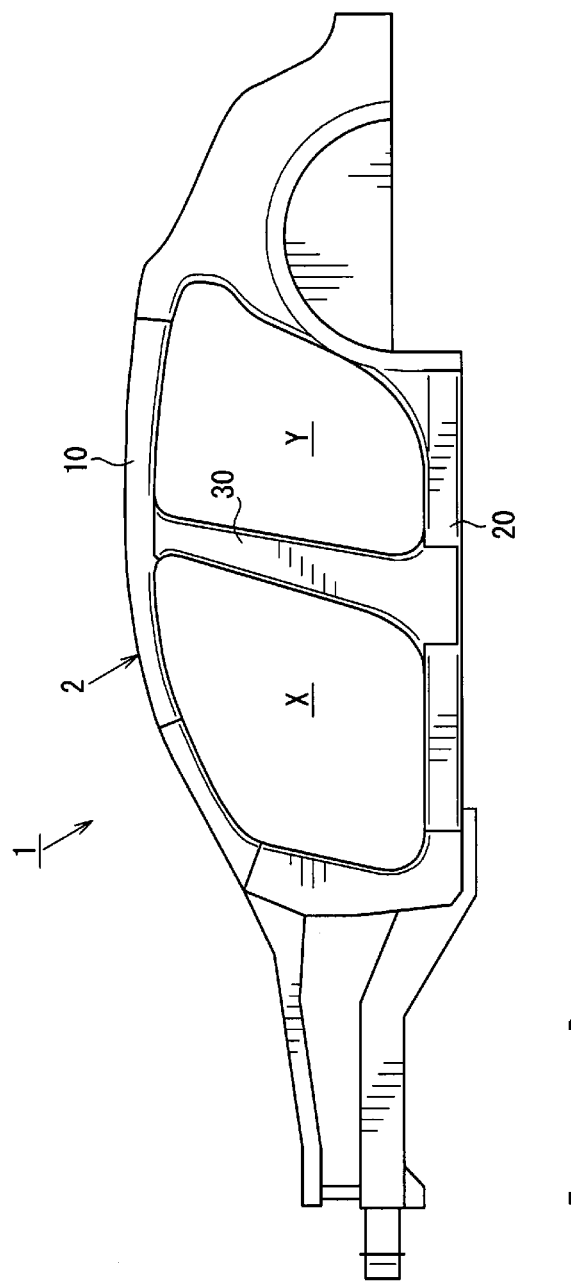
FIG. 1 is a left side view showing a left side of an outer appearance of a side vehicle-body structure of a vehicle.
Figure 2:
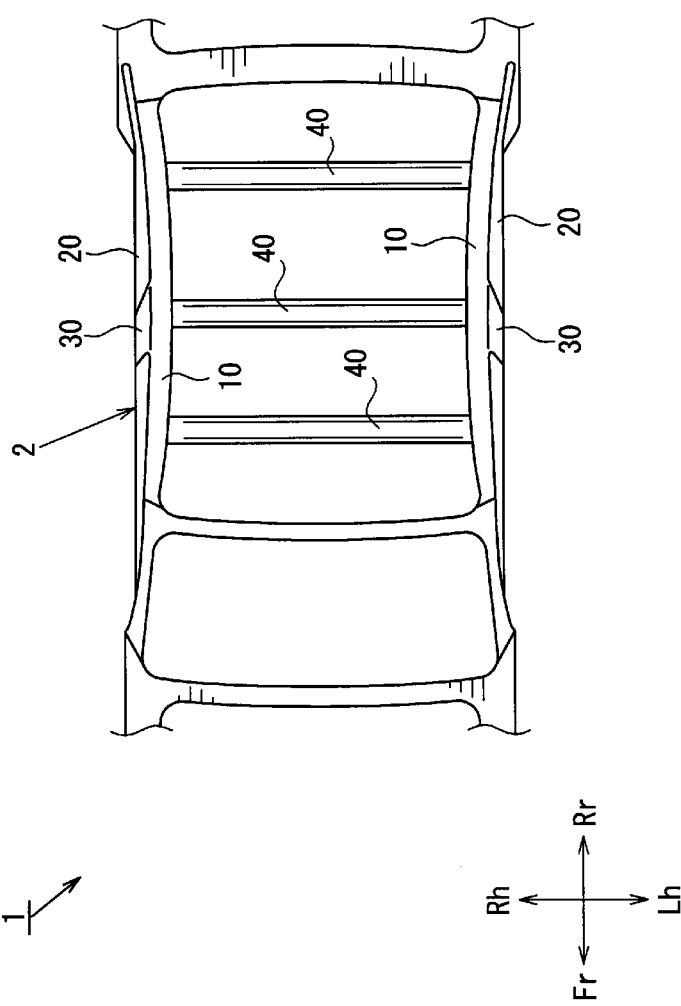
FIG. 2 is a plan view showing a connection state of right-and-left roof rails.
Figure 3:
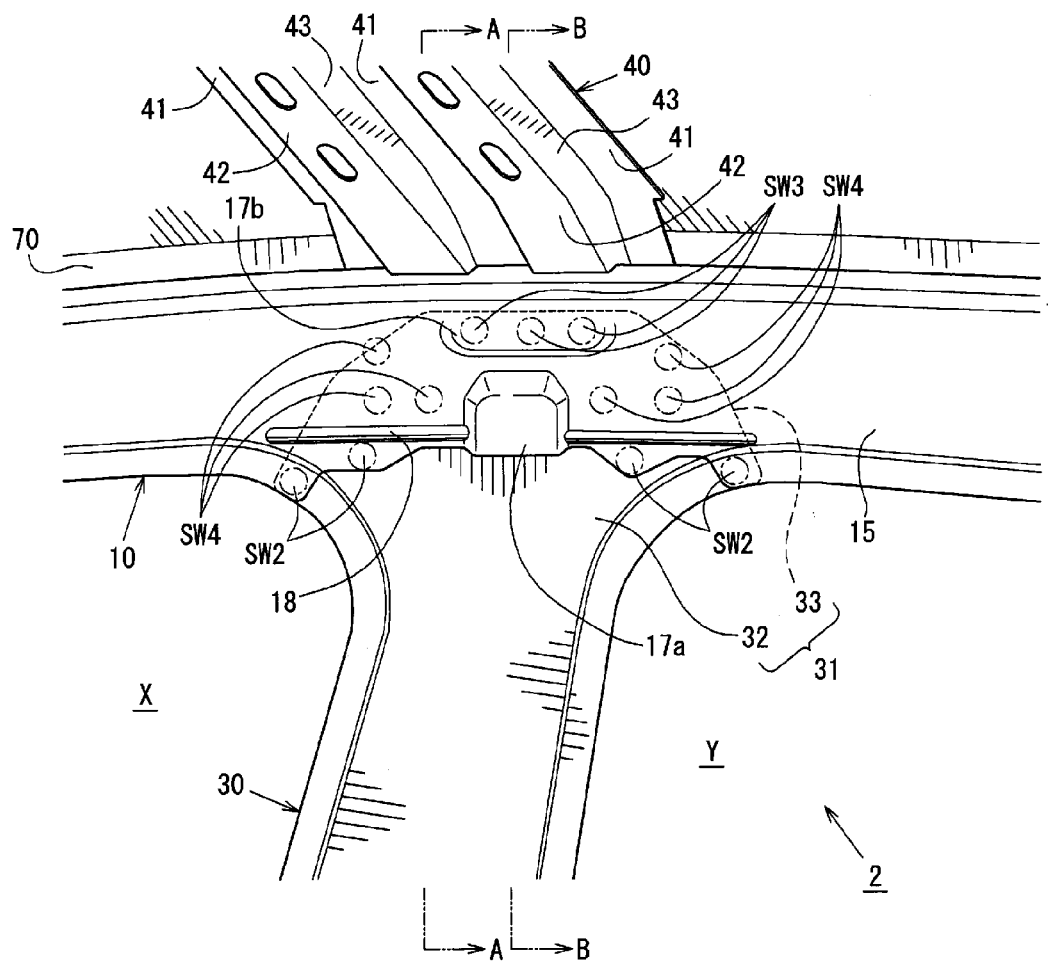
FIG. 3 is a major-part outer-appearance perspective view showing an outer appearance around a connection portion of the roof rail and a center pillar, when viewed from the inside of a vehicle compartment.
Figure 4:
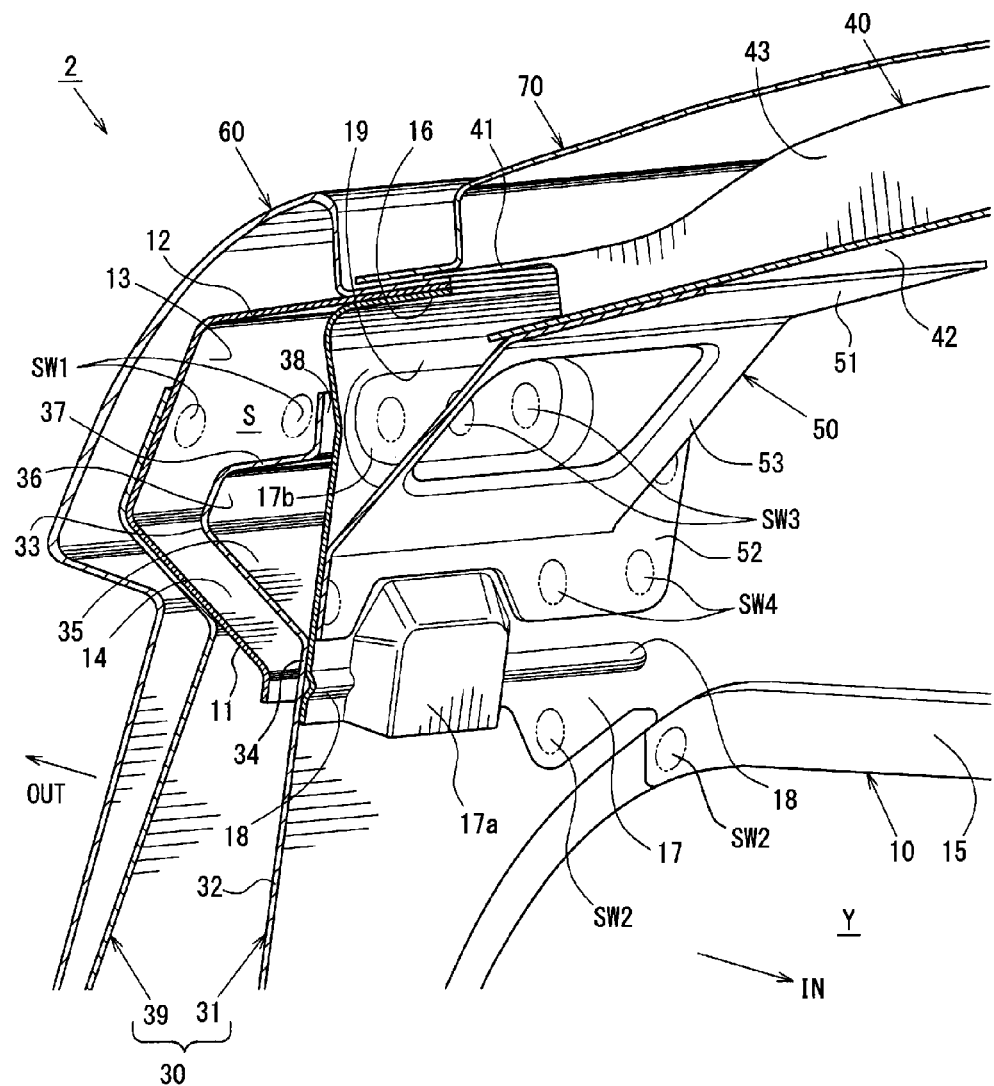
FIG. 4 is a major-part partially-sectional perspective view showing a major-part structure around a connection portion of the roof rail and the center pillar, taken along line A-A of FIG. 2.
Figure 5:
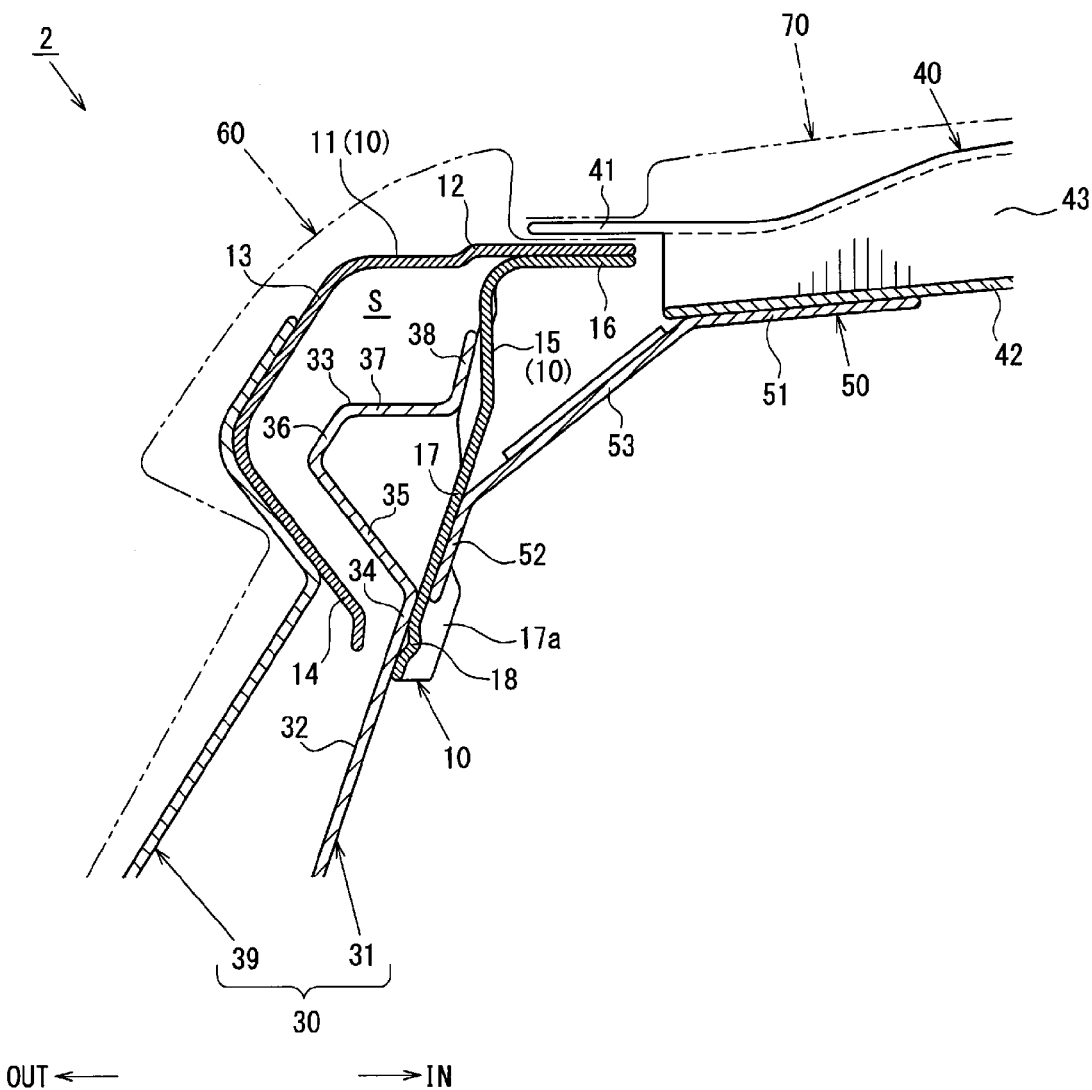
FIG. 5 is a sectional view taken along line A-A of FIG. 2.
Figure 6:
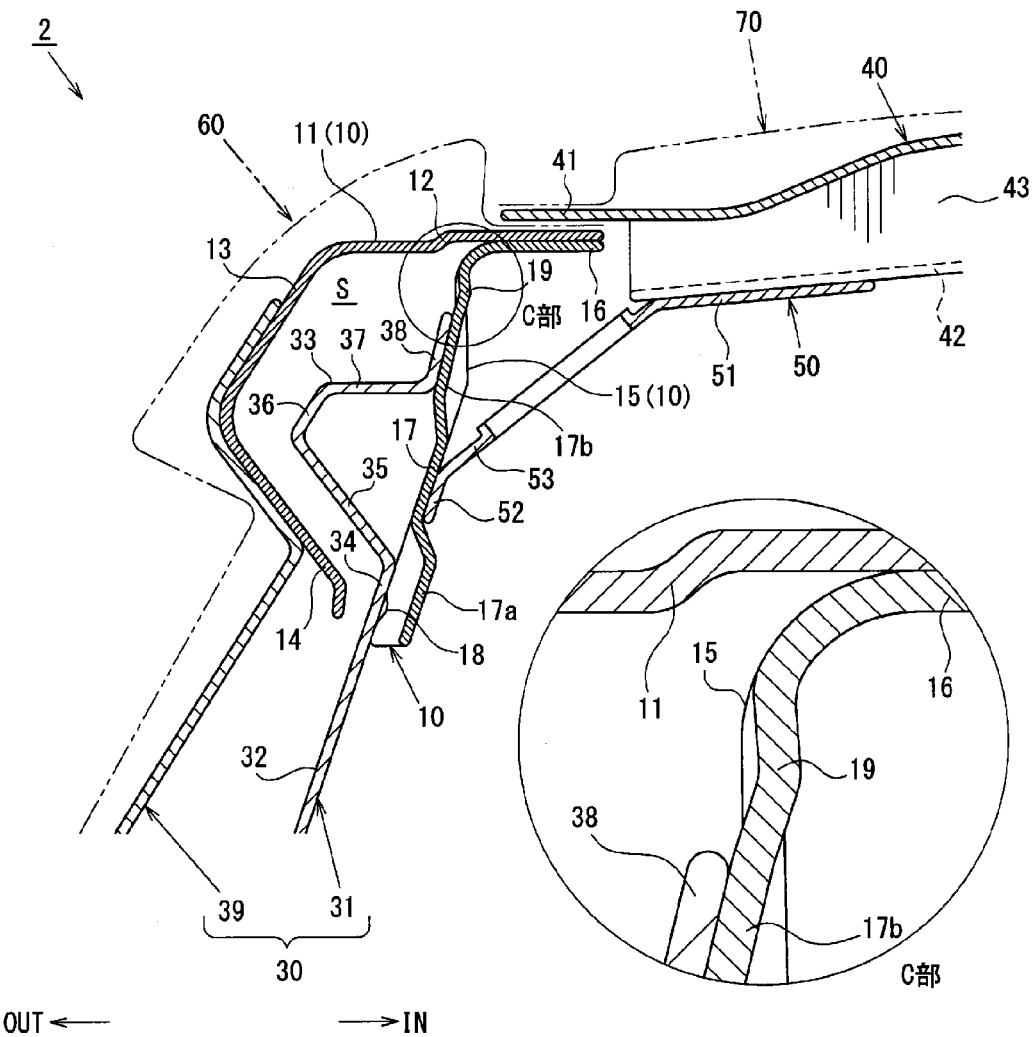
FIG. 6 is a sectional view taken along line B-B of FIG. 2.

FIG. 1 shows a left side view of an outer appearance of a side vehicle-body structure 2 of a vehicle 1, FIG. 2 shows a plan view of a connection state of right-and-left roof rails 10, FIG. 3 shows a major-part outer-appearance perspective view around a connection portion of the roof rail 10 and a center pillar 30, when viewed from the inside of a vehicle compartment, FIG. 4 shows a major-part partially-sectional perspective view around a connection portion of the roof rail 10 and the center pillar 20, taken along line A-A of FIG. 2, FIG. 5 shows a sectional view taken along line A-A of FIG. 2, and FIG. 6 shows a sectional view taken along line B-B of FIG. 2.

In FIG. 3, illustration of a roof gusset 50 is omitted. In FIGS. 5 and 6, a side frame outer panel 60 and a roof panel 70 are shown in two-dotted broken lines. In the figures, arrows Fr, Rr show a vehicle longitudinal direction, the arrow Fr showing a vehicle front and the arrow Rr showing a vehicle rear. Further, arrows Rh, Lh show a vehicle width direction, the arrow Rh showing a vehicle right and the arrow Lh showing a vehicle left. Additionally, an arrow IN shows an inward side in the vehicle width direction (toward the inside of a vehicle compartment), and an arrow OUT shows an outward side in the vehicle width direction.

The side vehicle-body structure 2 of the vehicle 1 comprises, as shown in FIG. 1, a pair of right-and-left roof rails 10 which extends in the vehicle longitudinal direction at an upper portion of a vehicle body, a pair of right-and-left side sills 20 which extends in the vehicle longitudinal direction at a lower portion of the vehicle body, and a center pillar 30 which connects a central portion, in the vehicle longitudinal direction, of each of the roof rails 10 and a central portion, in the vehicle longitudinal direction, of each of the side sills 20. Herein, door opening portions X, Y for passenger's ingress or egress are formed in front and rear of the center pillar 30 respectively, which are enclosed by the roof rail 10, the side sill 20, and the center pillar 30.

Further, the right-and-left roof rails 10 are, as shown in FIG. 2, arranged in the vehicle longitudinal direction with a specified distance therebetween, and connected by plural roof reinforcements 40 which extend in the vehicle width direction. Herein, one of the plural roof reinforcements 40 is, as shown in FIGS. 2 and 3, joined to a portion of the roof rail 10 which is located substantially at the same position, in the vehicle longitudinal direction, as an upper end of the center pillar 30.

Further, the side vehicle-body structure 2 of the vehicle 1 comprises, as shown in FIG. 4, a roof gusset 50 which reinforces a connection of the roof rail 10 and the roof reinforcement 40 in the vehicle compartment.

Additionally, the side vehicle-body structure 2 of the vehicle 1 comprises, as shown in FIGS. 4 and 5, a side frame outer panel 60 which is joined to an upper portion of the roof rail 10 by spot welding and forms a decorative face at a side portion of the vehicle 1. Further, at an upper portion of the vehicle 1 is provided a roof panel 70 which is joined to an outward end portion of the roof reinforcement 40 by spot welding and forms a decorative face at the upper portion of the vehicle 1.

Next, the structure around the connection portion of the roof rail 10 and the center pillar 30 of the side vehicle-body structure 2 of the vehicle 1 shown in FIG. 3 will be described specifically.

As shown in FIGS. 3 through 6, the roof rail 10 is formed in a solid shape having a specified plate thickness and also integrally by a roof rail outer panel 11 which is provided on an outward side in the vehicle width direction and a roof rail inner panel 15 which is provided to face the roof rail outer panel 11 in the vehicle with direction, which are joined together.

The roof rail outer panel 11 has a cross section in substantially a hat shape, and integrally comprises an outer upper face portion 12, an upper face of which the side frame outer panel 60 is joined to, an outer side face portion 13 which extends obliquely outward and downward from an outward edge side of the outer upper face portion 12, and an outer lower face portion 14 which extends obliquely inward and downward from a lower edge side of the outer side face portion 13.

The roof rail inner panel 15 has a cross section in substantially an inverse L shape, and integrally comprises an inner upper face portion 16 which is shorter than the outer upper face portion 12 and connected to a lower face of the outer upper face portion 12 and an inner side face portion 17 which extends obliquely outward and downward from an outward edge side of the inner upper face portion 16.

Further, at a lower portion of the inner side face portion 17 are, as shown in FIGS. 3 through 5, formed a protrusion portion 17a which protrudes inward in the vehicle width direction and bead portions 18 which extend longitudinally in front and back of the protrusion portion 17a and project inward in the vehicle width direction.

Meanwhile, at an upper portion of the inner side face portion 17 is, as shown in FIGS. 3, 4 and 6, formed a hollow portion 17b which is formed to extend in the vehicle longitudinal direction and to be concave outward in the vehicle width direction having a specified area of flat face. Additionally, at an upper edge side of the hollow portion 17b is, as shown in FIG. 6, formed a ridgeline portion 19 which gently projects inward in the vehicle width direction.

The roof rail outer panel 11 having the above-described shape and the roof rail inner panel 15 are joined together at specified positions by spot welding after the center pillar 30 (a pillar outer panel 39 and a pillar inner panel 31) is joined, whereby the roof rail 10 having an inner space S therein is formed.

Herein, a specified range of the roof rail 10 along the door opening portions X, Y has a closed cross section (not illustrated) which is formed by the roof rail outer panel 11 and the roof rail inner panel 15, which are joined together at their respective lower ends.

As shown in FIGS. 3 through 6, the center pillar 30 is formed in a solid shape having a specified plate thickness and also integrally by a pillar inner panel 31 which is joined to the roof rail inner panel 15 at an upper end thereof and a pillar outer panel 39 which is joined to the roof rail outer panel 11 at an upper end thereof. Herein, the center pillar 30 is made of a high-tension steel plate.

The pillar inner 31 is formed integrally by a pillar inner portion 32 which is positioned between the roof rail 10 and the side sill 20 and a load transmission portion 33 which is positioned in the inner space S of the roof rail 10.

The pillar inner portion 32 is configured such that it extends upward from a lower end thereof joined to the side sill 20 and an upper end thereof overlaps a lower end of an outward side, in the vehicle width direction, of the roof rail inner panel 15.

The load transmission portion 33 is configured to extend upward from an upper end of the pillar inner portion 32 and to have substantially the same longitudinal-width of that of the pillar inner portion 32. The load transmission portion 33 has substantially a hat-shaped cross section projecting toward the roof rail outer panel 11.

Specifically, the load transmission portion 33 integrally comprises a lower base portion 34 which extends from the upper end of the pillar inner portion 32 along the inner side face portion 17 to a position located above the bead portions 18, a first face portion 35 which extends outward from the lower base portion 34 substantially in parallel to the outer lower face portion 14, a second face portion 36 which extends upward from an outward edge side of the first face portion 35 substantially in parallel to the outer side face portion 13, a third face portion 37 which substantially horizontally extends inward from an upper edge side of the second face portion 36, and an upper base portion 38 which extends upward from an inward edge side of the third face portion 37 along the hollow portion 17b.

The pillar outer panel 39 extends from its lower end joined to the side sill 20 toward a vehicle-body upper portion, and is formed in a solid shape having its upper portion positioned along the roof rail outer panel 11. Specifically, the upper portion of the pillar outer panel 39 is positioned along outward faces of the outer side face portion 13 and the outer lower face portion 14 of the roof rail outer panel 11, and an upper end of the upper portion of the pillar outer panel 39 is positioned substantially at the same level as the upper end of the load transmission portion 33.

The pillar inner panel 31 having the above-described shape and the pillar outer panel 39 are joined together in the vehicle width direction and thereby form the center pillar 30. Specifically, the pillar outer panel 39 is positioned so as to overlap the outward face of the roof rail outer panel 11 with its upper end located substantially at the same level as the upper end of the load transmission portion 33 as shown in FIG. 5. And, the pillar outer panel 39 is joined to the roof rail outer panel 11 at plural welding portions SW1 by spot welding as shown in FIG. 4.

Meanwhile, the pillar inner panel 31 is joined to the roof rail inner panel 15, as shown in FIGS. 3 and 4, by spot-welding an upper portion of the pillar inner portion 32 and a lower portion of the inner side face portion 17 at plural welding portions SW2 and also by spot-welding the upper base portion 38 and the hollow portion 17b at plural welding portions SW3.

The pillar outer panel 39 and the pillar inner panel 31 are joined in the vehicle width direction together with the roof rail outer panel 11 and the roof rail inner panel 15. Herein, a specified range of the center pillar 30 along the door opening portions X, Y has a closed cross section (not illustrated) which is formed by the pillar inner panel 31 and the pillar outer panel 39, which are joined together at their respective longitudinal ends.

As shown in FIGS. 3 through 6, the roof reinforcement 40 has a specified plate thickness and also integrally comprises three reinforcement upper face portions 41 which are joined to an upper face of the outer upper face portion 12 of the roof outer panel 11 via the side frame outer panel 60, two reinforcement lower face portion 42 which are joined to the roof gusset 50 below the reinforcement upper face portions 41, and reinforcement side face portions 43 which vertically connect the reinforcement upper face portions 41 and the reinforcement lower face portion 42 which are arranged one after the other in the vehicle longitudinal.

As shown in FIGS. 4 through 6, the roof gusset 50 integrally comprises a gusset upper portion 51 which is joined to a lower face of the reinforcement upper face portion 41 of the roof reinforcement 40, a gusset lower portion 52 which is joined to a portion of the inner side face portion 17 which is located above the protrusion portion 17a, and a gusset slant portion 53 which extends obliquely inward and upward toward the roof reinforcement 40 from the gusset lower portion 52 and connects an outward edge side of the gusset upper portion 51 and an upper edge side of the gusset lower portion 52.

And, the roof gusset 50 is joined to the roof reinforcement 40 by spot-welding the gusset upper portion 51 to a lower face of the reinforcement lower face portion 42. Further, the roof gusset 50 is, as shown in FIGS. 3 and 4, joined to the roof rail inner panel 15 by positioning the gusset lower portion 52 so as to overlap an outward face of the inner side face portion 17 and then by spot-welding them at their six welding portions SW4.

Figure 7:
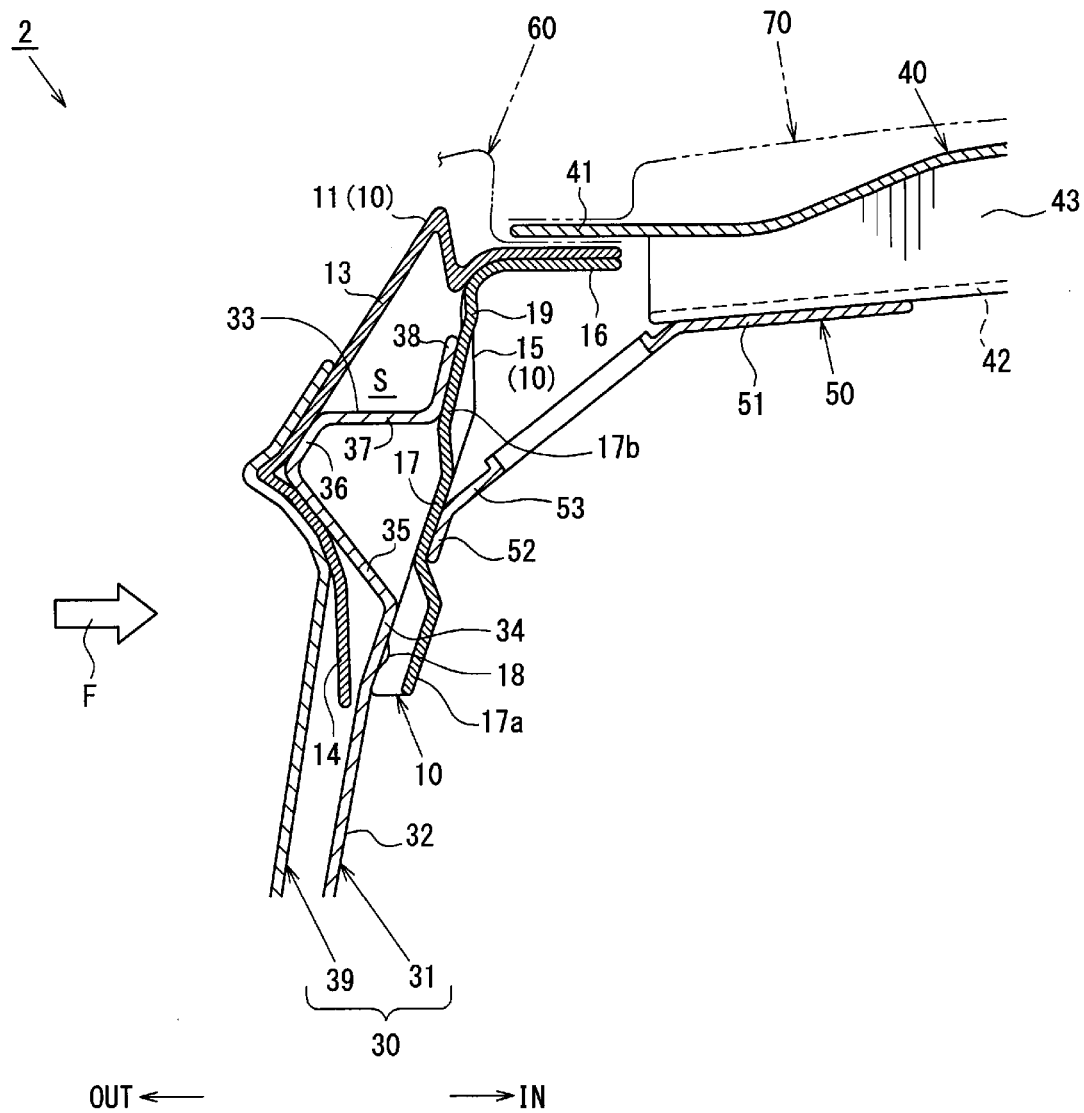
FIG. 7 is a sectional view taken along line B-B, which shows a state of the side vehicle-body structure in a collision.

A state of the above-described side vehicle-body structure 2 of the vehicle 1 in which a collision load is applied to the side face of the vehicle 1 will be described referring to FIG. 7. FIG. 7 shows a sectional view taken along line B-B, which shows a state of the side vehicle-body structure 2 in a collision. In FIG. 7, illustration of the side frame outer panel 60 is omitted.

When another vehicle collides with the vehicle 1 or the side portion of the vehicle 1 hits against an obstacle, a collision load is applied to the pillar outer panel 39 of the center pillar 30 in a collision direction F as shown in FIG. 7. Herein, an initial-stage collision load in the initial state of collision is transmitted and dispersed to the roof reinforcement 40 via the roof rail 10 and the roof gusset 50. Then, once the collision load increased according to the progress of collision becomes not receivable by the center pillar 30, the center pillar 30 starts deforming in the collision direction F, i.e., toward the inside of the vehicle compartment.

In this situation, since the upper portion of the pillar outer panel 39 receiving the collision load presses the roof rail outer panel 11 in the collision direction F, the roof rail outer panel 11 starts deforming so as to be crushed toward the inside of the vehicle compartment.

As the roof rail outer panel 11 deforms, as shown in FIG. 7, the outer side face 13 contacts the second face portion 36 of the load transmission portion 33 in the vehicle width direction, and also the outer lower face portion 14 contacts the first face portion 35.

Accordingly, the collision load applied to the pillar outer panel 39 is transmitted and dispersed from the roof rail outer panel 11 to the roof reinforcement 40 via the load transmission portion 33. Specifically, the collision load is transmitted from the second face portion 36 of the load transmission portion 33 contacting the outer side face portion 13 to the inner side face portion 17 via the first face portion 35 and the third face portion 37. Further, the collision load transmitted to the inner side face portion 17 is transmitted and dispersed to the roof reinforcement 40 via the inner upper face portion 16 and the roof gusset 50.

The side vehicle-body structure 2 of the vehicle 1 which transmits and disperses the collision load to the roof reinforcement 40 as described above can restrain the center pillar 30 from coming into the vehicle compartment, restraining any improper increase of the number of components.

Specifically, when the upper portion of the pillar outer panel 39 presses the roof rail outer panel 11 toward the inside of the vehicle compartment according to the deformation of the pillar outer panel 39 toward the inside of the pillar outer panel 39 due to the collision load, the roof rail outer panel 11 starts its deforming toward the roof rail inner panel 15.

Herein, since the load transmission portion 33 projects toward the roof rail outer panel 11, the roof rail outer panel 11 can contact the load transmission portion 33 at the initial stage of deformation. Accordingly, the side vehicle-body structure 2 of the vehicle 1 can transmit the collision load from the roof rail outer panel 11 to the roof reinforcement 40 via the load transmission portion 33 and the roof rail inner panel 15.

Thereby, the collision load increasing according to the progress of collision is transmitted to the roof reinforcement 40 at the initial stage, so that the deformation of the roof rail 10 toward the inside of the vehicle compartment due to the collision load can be properly restrained. That is, the center pillar 30 can be restrained from coming into the vehicle compartment in accordance with the deformation of the roof rail 10 toward the inside of the vehicle compartment.

Additionally, since the side vehicle-body structure 2 of the vehicle 1 can achieve the early transmission and dispersion of the collision load, restraining any improper increase of the number of components by means of the load transmission portion 33, the weight increase of the entire vehicle can be restrained.

Further, since the center pillar 30 is comprised of the pillar inner panel 31 and the pillar outer panel 39, the side vehicle-body structure 2 of the vehicle 1 can transmit the collision load from the pillar outer panel 39 to the roof reinforcement 40 via the roof rail outer panel 11 at the initial stage before the start of deformation of the pillar outer panel 39, and also transmit and disperse the collision load from the pillar outer panel 39 to the roof reinforcement 40 via the pillar inner panel 31 and the roof rail inner panel 15.

Thereby, the side vehicle-body structure 2 of the vehicle 1 can transmit and disperse the collision load to the roof reinforcement 40 in order from the initial stage of collision. That is, the side vehicle-body structure 2 of the vehicle 1 establishes plural transmission paths for the transmission and dispersion of the collision load in accordance with the progress of collision, so that deformation of the roof rail 10 into the vehicle compartment can be restrained. Accordingly, the side vehicle-body structure 2 of the vehicle 1 can restrain the center pillar 30 from coming into the vehicle compartment, restraining any improper increase of the number of components.

Further, since the upper end of the pillar outer panel 39 is connected to the roof rail outer panel 11 substantially at the same position as the upper end of the load transmission portion 33, the side vehicle-body structure 2 of the vehicle 1 can surely transmit the collision load to the load transmission portion 33.

Specifically, there is a concern that in a case in which the upper end of the pillar outer panel 39 is connected to the lower portion of the outer lower face portion 14 which is located at a position below the load transmission portion 33, deformation of the roof rail outer panel 11 relative to the load transmission portion 33 may become unstable, so that the transmission efficiency of the collision load between the pillar outer panel 39 and the load transmission portion 33 may not be stable.

By contrast, since the upper end of the pillar outer portion 33 is connected to the roof rail outer panel 39 substantially at the same position as the upper end of the load transmission portion 33, the side vehicle-body structure 2 of the vehicle 1 can enlarge the overlapping area of the pillar outer panel 39 with the roof rail outer panel 11.

Further, since the upper portion of the pillar outer panel 39 is formed along the roof rail outer panel 11, a contact area of the pillar outer panel 39 and roof rail outer panel 11 can be properly large.

Accordingly, the pillar outer panel 39 can surely press the roof rail outer panel 11 so that a range of the roof rail outer panel 11 facing the load transmission portion 33 can be uniformly crushed toward the inside of the vehicle compartment. Thereby, the roof rail outer panel 11 contacts the load transmission portion 33 surely, so that the collision load can be more efficiently transmitted to the load transmission portion 33.

Accordingly, the side vehicle-body structure 2 of the vehicle 1 can more surely transmit the collision load transmitted to the roof rail outer panel 11 to the load transmission portion 33. Thereby, the side vehicle-body structure 2 of the vehicle 1 can restrain the deformation of the roof rail 10 toward the inside of the vehicle compartment.

Accordingly, the side vehicle-body structure 2 of the vehicle 1 can restrain the center pillar 30 from coming into the vehicle compartment by surely transmitting the collision load from the roof rail outer panel 11 to the load transmission portion 33.

Further, since the bead portions 18 and the ridgeline portion 19 are formed at the roof rail inner panel 15, the side vehicle-body structure 2 of the vehicle 1 can increase the rigidity of portions of the roof rail inner panel 15 near the lower base portion 34 and the upper base portion 38 of the load transmission portion 33. Thereby, the deformation of the roof rail inner panel 15 toward the inside of the vehicle compartment against pressing of the lower base portion 34 and the upper base portion 38 of the load transmission portion 33 can be restrained.

Accordingly, the side vehicle-body structure 2 of the vehicle 1 can properly restrain the center pillar 30 from coming into the vehicle compartment by increasing the rigidity of the portions of the roof rail inner panel 15 near the lower base portion 34 and the upper base portion 38 of the load transmission portion 33.

Further, since the gusset lower portion 52 of the roof gusset 50 is joined to a portion of the roof rail inner panel 15 near the lower base portion 34, the collision load can be transmitted from the lower base portion 34 of the load transmission portion 33 to the roof gusset 50 via the roof rail inner panel 15 and also the collision load can be transmitted from the roof gusset 50 to the roof reinforcement 40.

Further, since the roof gusset 50 is provided, the side vehicle-body structure 2 of the vehicle 1 can strengthen the connection of the roof rail 10 and the roof reinforcement 40 and transmit and disperse the collision load applied to the center pillar 30 to the roof reinforcement 40 directly. Additionally, the rigidity of a portion of the roof rail inner panel 15 near the lower base portion 34 of the load transmission portion 33 can be increased.

Thereby, the side vehicle-body structure 2 of the vehicle 1 can reduce the collision load transmitted to the roof rail 10, thereby properly restraining the roof rail 10 from deforming toward the inside of the vehicle compartment. Accordingly, the side vehicle-body structure 2 of the vehicle 1 can properly restrain the center pillar 30 from coming into the vehicle compartment by reducing the collision load transmitted to the roof rail 10 via the roof gusset 50.

Further, since the first face portion 35 of the load transmission portion 33 is formed substantially in parallel to the outer lower face portion 14 of the roof rail outer panel 11 and the second face portion 36 of the load transmission portion 33 is formed substantially in parallel to the outer side face portion 13 of the roof rail outer panel 11, the roof rail outer panel 11 deforms so as to closely contact the load transmission portion 33. Thereby, the contact area of the roof rail outer panel 11 and load transmission portion 33 can be ensured properly.

Thereby, the side vehicle-body structure 2 of the vehicle 1 can disperse the collision load from the roof rail outer panel 11 to the load transmission portion 33. Accordingly, a stress concentration on the roof rail outer panel 11 can be reduced, so that the roof rail 10 can be restrained from deforming toward the inside of the vehicle compartment.

Accordingly, the side vehicle-body structure 2 of the vehicle 1 can restrain the roof rail 10 from deforming toward the inside of the vehicle compartment by forming the first face portion 35 and the second face portion 36 of the load transmission portion 33 substantially in parallel to the outer side face portion 13 and the outer lower face portion 14 of the roof rail outer panel 11.

Further, since the third face portion 37 of the load transmission portion 33 is formed substantially horizontally, i.e., substantially in parallel to the collision direction F, the rigidity of the load transmission portion 33 against the collision direction F can be increased properly.

Thereby, any buckling of the load transmission portion 33 receiving the collision load can be prevented. Accordingly, since the deformation of the roof rail 10 toward the inside of the vehicle compartment can be restrained, the center pillar 30 can be restrained from coming into the vehicle compartment.

Moreover, the load transmission portion 33 can surely receive the roof rail outer panel 11, thereby surely transmit and disperse the collision load to the roof reinforcement 40. Accordingly, the side vehicle-body structure 2 of the vehicle 1 can surely transmit and disperse the collision load to the roof reinforcement 40 by forming the third face portion 37 of the load transmission portion 33 substantially horizontally, so that the center pillar 30 can be properly restrained from coming into the vehicle compartment.

Further, since the hollow portion 17b having the specified area of flat face is formed at the roof rail inner panel 15, the load transmission portion 33 can be joined to the roof rail inner panel 15 properly by spot welding.

While the pillar inner panel 31 is comprised of the pillar inner portion 32 and the load transmission portion 33 which are formed integrally in the above-described embodiment, the pillar inner portion 32 and the load transmission portion 33 may be formed separately from each other.

Figure 8:
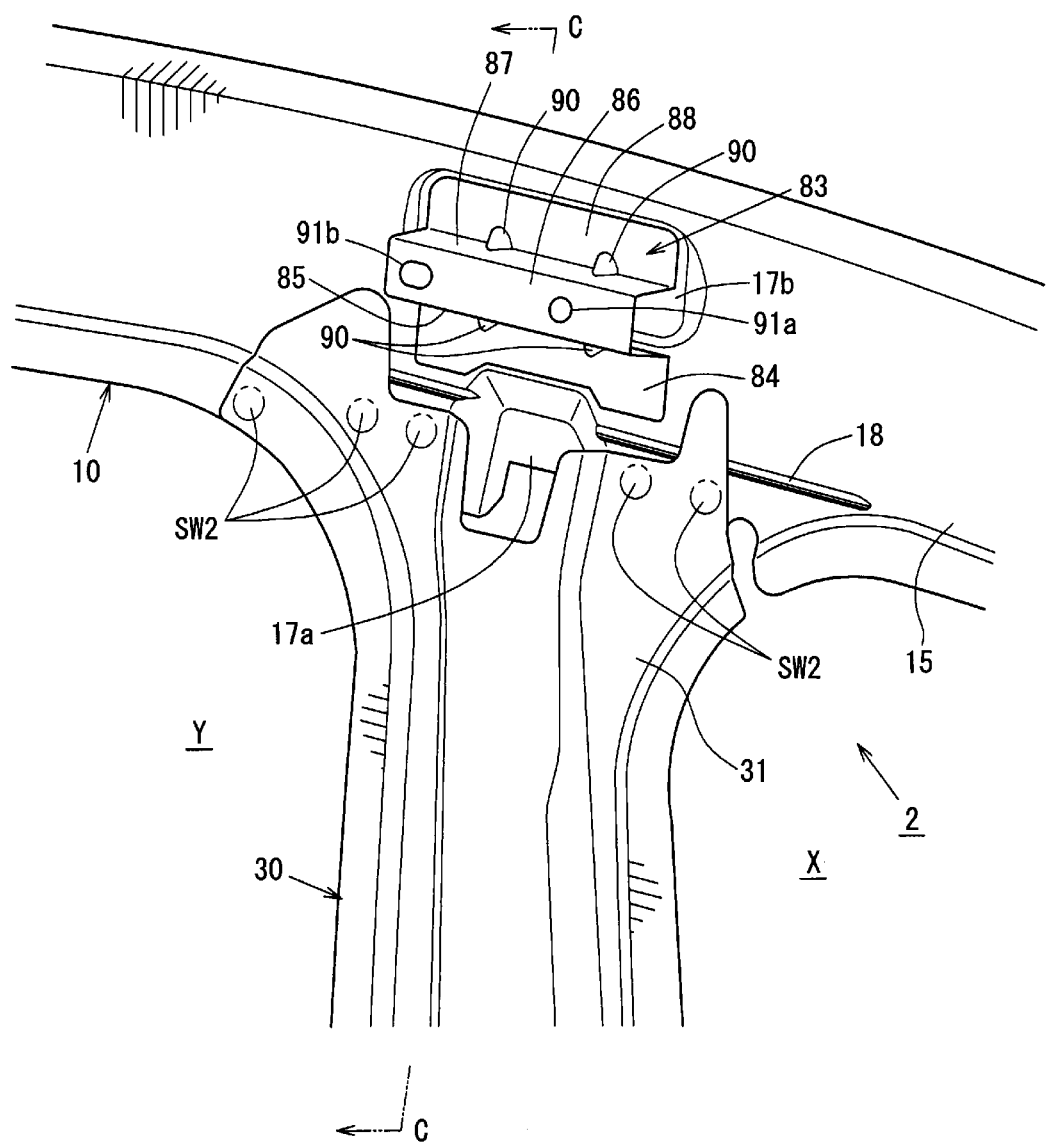
FIG. 8 is a major-part outer-appearance perspective view showing an outer appearance around a connection portion of a roof rail and a center pillar according to another embodiment of the side vehicle-body structure of a vehicle, when viewed from the outside of the vehicle compartment.
Figure 9:
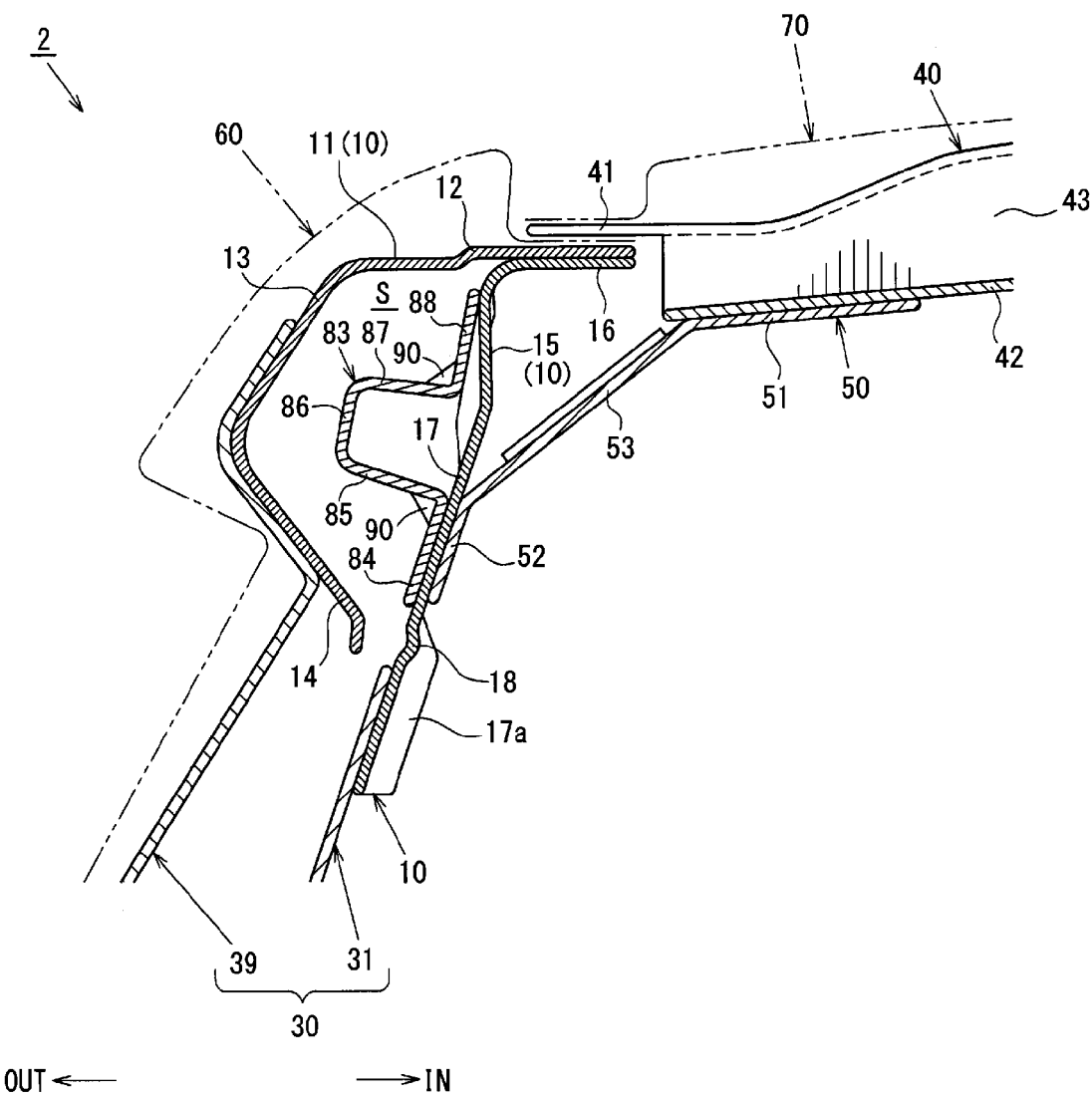
FIG. 9 is a sectional view taken along line C-C of FIG. 8.
Figure 10:
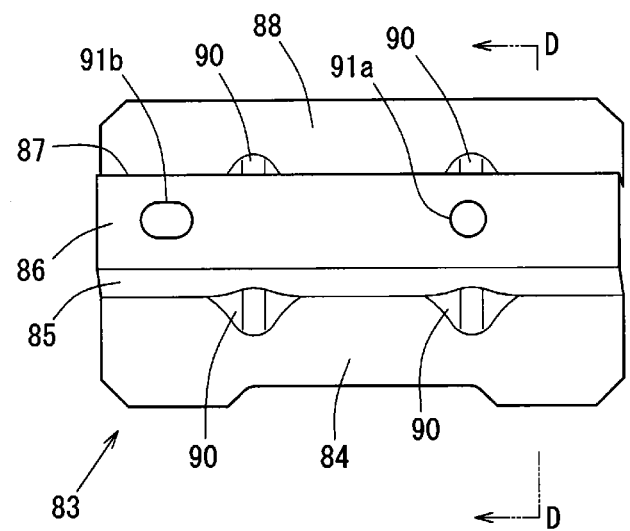
FIG. 10 is an elevational view of a load transmission portion.
Figure 11:
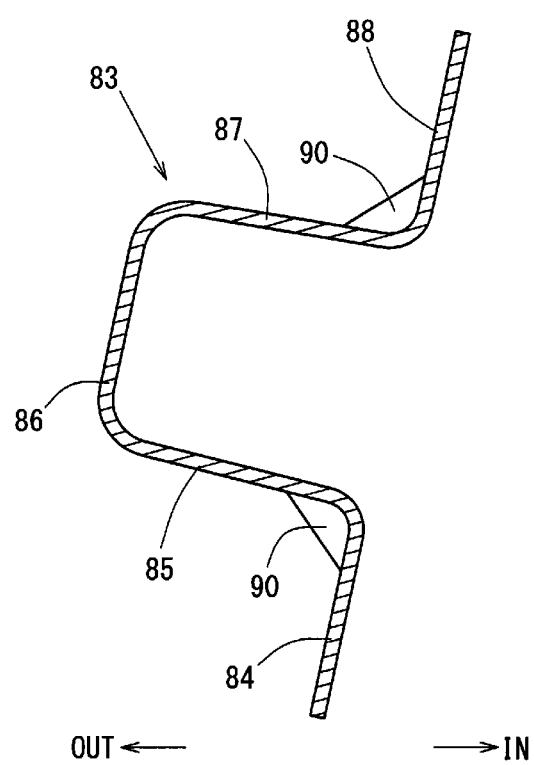
FIG. 11 is a sectional view taken along line D-D of FIG. 10.

FIGS. 8 through 11 show another embodiment of the side vehicle-body structure 2 of the vehicle 1. FIG. 8 is a major-part outer-appearance perspective view showing an outer appearance around the connection portion of the roof rail 10 and the center pillar 30, FIG. 9 is a sectional view taken along line C-C of FIG. 8, FIG. 10 is an elevational view of the load transmission portion 33, and FIG. 11 is a sectional view taken along line D-D of FIG. 10. In FIGS. 8 through 11, the same structure elements as those of the previous embodiment disclosed in FIGS. 1 through 7 are denoted by the same reference characters, descriptions of which are omitted.

In the embodiment disclosed in FIGS. 8 through 11, the pillar inner panel 31 which corresponds to the pillar inner portion 32 and the load transmission portion 83 are formed separately from each other. Further, the load transmission portion 83 has a cross section which is formed substantially in a hat shape projecting toward the roof rail outer panel 11.

Specifically, the load transmission portion 83 is made of substantially a rectangular-shaped panel so as to have substantially the hat-shaped cross section through pressing, and integrally comprises a lower base portion 84 which extends from a position above the upper end of the pillar inner panel 31 along the inner side face portion 17, a first face portion 85 which substantially horizontally extends outward from the lower base portion 84, a second face portion 86 which extends upward from an outward edge side of the first face portion 85, a third face portion 87 which substantially horizontally extends inward from an upper edge side of the second face portion 86, and an upper base portion 88 which extends upward from an inward edge side of the third face portion 87 along the hollow portion 17b.

As described above, in the case in which the load transmission portion 83 is formed separately, the roof rail inner panel 15 is joined, by spot welding, at welding portions SW2 of the inner side face portion 17. Meanwhile, the load transmission portion 83 is joined to the roof rail inner panel 15 at the lower base portion 84 and the upper base portion 88. Specifically, as shown in FIG. 9, the upper base portion 88 is spot-welded to the hollow portion 17b of the inner side face portion 17, and the lower base portion 84 is joined to a position above the pillar inner panel 31 and/or a lower portion of the inner side face portion 17, where the lower base portion 84, the inner side face portion 17, and the gusset lower portion 52 are overlapped and joined together by spot welding.

In the embodiment shown in FIGS. 8 through 11, as shown in FIG. 9, a corner portion which is formed between the lower base portion 84 and the first face portion 85 of the load transmission portion 83 and a corner portion which is formed between the gusset lower portion 52 and the gusset slant portion 53 of the roof gusset 50 are arranged at the same level in the vehicle vertical direction.

Further, as shown in FIGS. 8 through 11, protrusion portions 90 which protrude in the vehicle vertical direction are formed at front and rear portions of the corner portion formed between the lower base portion 84 and the first face portion 85 and also at front and rear portions of the corner portion formed between the upper base portion 88 and the third face portion 87.

Moreover, the second face portion 86 has front and rear positioning holes 91a, 91b. These positioning holes 91a, 91b, which are of a circular shape and an oval shape, respectively, perform the positing function of the load transmission portion 83 in cooperation with positing pins (not illustrated) to be inserted into these holes 91a, 91b at the time of assembling the load transmission portion 83.

The positioning hole 91a is located at a position slightly near the front end of the second face portion 86, and the positioning hole 91b is located at a position more-closely near the rear end of the second face portion 86. Thus, the both positioning holes 91a, 91b are arranged asymmetrically in the vehicle longitudinal direction.

In this case, by forming the load transmission portion 83 in a similar shape but not in a symmetric shape, the positions of the actual positioning holes 91a, 91b (positioning pins) become unmatched in the vehicle width direction. If the load transmission portion 83 is tried to be assembled upside down, the position of the load transmission portion 83 becomes unmatched, so that the assembling is not capable. Accordingly, by forming the load transmission portion 83 in the similar shape in the vehicle width direction, an erroneous assembling of the load transmission portion 83 can be surely prevented.

As described above, according to the embodiment shown in FIGS. 8 through 11, the pillar inner panel 31 and the load transmission portion 83 are formed separately from each other, since no load transmission portion is formed at the pillar inner panel 31, a panel material to make the pillar inner panel 31 can be used efficiently. Since the load transmission portion 83 is made of a panel material having a simple shape, like the rectangular shape, the panel material of the pillar inner panel 31 can be used efficiently as well.

Additionally, since the another panel than the pillar inner panel 31 is formed to have substantially the hat-shaped cross section through pressing, no die for pressing may be necessary, so that the productivity may improve.

Further, since three members of the lower base portion 84 of the load transmission portion 83, the inner side face portion 17, and the gusset lower portion 52 of the roof gusset 50 are overlapped and joined together, the collision load can be smoothly transmitted from the lower base portion 84 of the load transmission portion 83 to the roof gusset 50 via the roof rail inner panel 15, and then to the roof reinforcement 40 by way of the roof gusset 50.

Further, since the corner portion of the load transmission portion 83 which is formed between the lower base portion 84 and the first face portion 85 and the corner portion of the roof gusset 50 which is formed between the gusset lower portion 52 and the gusset slant portion 53 are arranged at the same level in the vehicle vertical direction, the load transmission can be properly smoothly transmitted from the first face portion 85 of the load transmission 83 to the gusset slant portion 53 of the roof gusset 50. Accordingly, the collision load can be smoothly transmitted from the lower base portion 84 of the load transmission portion 83 to the roof gusset 50 via the roof rail inner panel 15, and then to the roof reinforcement 40.

Further, since the protrusion portions 90 protruding in the vehicle vertical direction are formed respectively at the front and rear portions of the corner portion formed between the lower base portion 84 and the first face portion 85 and at the front and rear portions of the corner portion formed between the upper base portion 88 and the third face portion 87, the strength of the load transmission portion 33 can be increased by the protrusion portions 90.

In general, in a case in which the above-described corner portion is formed through pressing of the load transmission portion 83, a so-called spring back (i.e., recovering to an original flat-face shape due to a panel's elasticity) may happen. However, since the protrusion portions 90 are formed as described above, the spring back after pressing can be restrained properly, thereby improving the forming of shapes.

The present invention should not be limited to the above-described embodiments, and any other modifications or improvements may be applied within the scope of a spirit of the present invention.

For example, while the side frame outer panel 60 is formed separately in the above-described embodiments, the roof rail outer panel 11, the pillar outer panel 39, and the side frame outer panel 60 may be formed integrally so as to constitute the side frame outer panel. Also, the reinforcement extending in the vehicle longitudinal direction may be provided at the inward faces, in the vehicle width direction, of the outer side face portion 13 and the outer lower face portion 14 of the roof rail outer panel 11.

Further, while the gusset lower portion 52 of the roof gusset 50 is joined to the portion of the roof rail inner panel 15 which is located above the bead portions 18, the gusset lower portion 52 may be joined to the roof rail inner panel 15 at a position corresponding to the lower base portion 34, 84, without providing the bead portions 18.

Moreover, while the bead portions 18 are formed at the lower portion of the inner side face portion 17 of the roof rail inner panel 15 and the ridgeline portion 19 is formed the upper portion of the inner side face portion 17 of the roof rail inner panel 15, the bead portions may be formed at the upper portion and the ridgeline portion may be formed at the lower portion. Instead, either the bead portions or the ridgeline portion may be formed at either one or both of the upper portion and the lower portion. Herein, it is preferable that the ridgeline portion 19 be so strong that any buckling of the inner side face portion 17 may not be caused by the collision load.

The roof rail outer portion according to the present invention corresponds to the roof rail outer panel 11 of the above-described embodiments. Likewise, the roof rail inner portion corresponds to the roof rail inner panel 15, the pillar outer portion corresponds to the pillar outer panel 39, the base portion corresponds to the lower base portions 34, 84 and the upper base portions 38, 88, the projection portion corresponds to the bead portion 18 and the ridgeline portion 19, and the side wall portion corresponds to the first face portion 85 and the third face portion 87.

What is claimed is:

1. A side vehicle-body structure of a vehicle, comprising:
a pair of right-and-left roof rails extending in a vehicle longitudinal direction at an upper portion of a vehicle body, each of the roof rails being formed integrally by a roof rail outer portion provided on an outward side and a roof rail inner portion provided on an inward side;

a roof reinforcement extending in a vehicle width direction and connecting the pair of right-and-left roof rails;

a pair of right-and-left side sills extending in the vehicle longitudinal direction at a lower portion of the vehicle body; and a center pillar connecting a central portion, in the vehicle longitudinal direction, of each of the roof rails and a central portion, in the vehicle longitudinal direction, of each of the side sills, the center pillar being formed integrally by a pillar outer portion which is connected to the roof rail outer portion of the roof rail at an upper end thereof and a pillar inner portion which is connected to the roof rail inner portion of the roof rail at an upper end thereof, wherein a load transmission portion is provided at a position between said roof rail outer portion and said roof rail inner portion which is located substantially at the same longitudinal-position as the upper end of said pillar outer portion, an upper end of the load transmission portion being connected to an outward face of the roof rail inner portion, a lower end of the load transmission portion being connected to the upper end of said pillar inner portion or the outward face of the roof rail inner portion, the load transmission portion having a projection that projects outward toward the roof rail outer portion, said projection being positioned in an inner space of the roof rail.

2. The side vehicle-body structure of a vehicle of claim 1, wherein the upper end of said pillar outer portion is connected to said roof rail outer portion substantially at the same position as an upper portion of said load transmission portion.

3. The side vehicle-body structure of a vehicle of claim 2, wherein said load transmission portion has a base portion thereof positioned on a side of said roof rail inner portion and is configured to project outward toward the roof rail outer portion so as to have substantially a hat-shaped cross section, and a projection portion which projects inward and extends in the vehicle longitudinal direction is provided at a portion of the roof rail inner portion which is located near the base portion of the load transmission portion.

4. The side vehicle-body structure of a vehicle of claim 3, wherein said roof reinforcement is connected to said roof rail at substantially at the same longitudinal-position as an upper end of said center pillar, and a roof gusset which connects the roof reinforcement and the center pillar is provided, a lower end of the roof gusset being connected to said roof rail inner portion substantially at the same position as a lower end of said load transmission portion.

5. The side vehicle-body structure of a vehicle of claim 1, wherein said load transmission portion has a base portion thereof positioned on a side of said roof rail inner portion and is configured to project outward toward the roof rail outer portion so as to have substantially a hat-shaped cross section, and a projection portion which projects inward and extends in the vehicle longitudinal direction is provided at a portion of the roof rail inner portion which is located near the base portion of the load transmission portion.

6. The side vehicle-body structure of a vehicle of claim 5, wherein said roof reinforcement is connected to said roof rail at substantially at the same longitudinal-position as an upper end of said center pillar, and a roof gusset which connects the roof reinforcement and the center pillar is provided, a lower end of the roof gusset being connected to said roof rail inner portion substantially at the same position as a lower end of said load transmission portion.

7. The side vehicle-body structure of a vehicle of claim 1, wherein said roof reinforcement is connected to said roof rail at substantially at the same longitudinal-position as an upper end of said center pillar, and a roof gusset which connects the roof reinforcement and the center pillar is provided, a lower end of the roof gusset being connected to said roof rail inner portion substantially at the same position as a lower end of said load transmission portion.

8. The side vehicle-body structure of a vehicle of claim 1, wherein said pillar inner portion and said load transmission portion are formed separately from each other, the load transmission portion is configured to have substantially a hat-shaped cross section and upper and lower base portions thereof, the upper and lower base portions of the load transmission portion being connected to said roof rail inner portion.

9. The side vehicle-body structure of a vehicle of claim 8, wherein said roof reinforcement is connected to said roof rail at substantially at the same longitudinal-position as an upper end of said center pillar, a roof gusset which connects the roof reinforcement and the center pillar is provided, three members of said lower base portion of the load transmission portion, said roof rail inner portion, and a lower end of said roof gusset are overlapped and joined together, and a corner portion of said load transmission portion which is formed between said lower base portion and a side wall portion extending outward from the lower base portion and a corner portion of said roof gusset which is formed between said lower end of the roof gusset and a gusset slant portion extending obliquely inward and upward toward said roof reinforcement from the lower end are arranged at the same level in a vehicle vertical direction.

10. The Side vehicle-body structure of a vehicle of claim 9, wherein protrusion portions which protrude in a vehicle vertical direction are formed at part of corner portions of said load transmission portion which are formed between said base portions and Side wall portions extending outward from the base portions.

11. The side vehicle-body structure of a vehicle of claim 8, wherein a corner portion of said load transmission portion which is formed between said lower base portion and a side wall portion extending outward from the lower base portion and a corner portion of said roof gusset which is formed between said lower end of the roof gusset and a gusset slant portion extending obliquely inward and upward toward said roof reinforcement from the lower end are arranged at the same level in a vehicle vertical direction.

12. The side vehicle-body structure of a vehicle of claim 2, wherein said pillar inner portion and said load transmission portion are formed separately from each other, the load transmission portion is configured to have substantially a hat-shaped cross section and upper and lower base portions thereof, the upper and lower base portions of the load transmission portion being connected to said roof rail inner portion.

13. The side vehicle-body structure of a vehicle of claim 12, wherein a corner portion of said load transmission portion which is formed between said lower base portion and a side wall portion extending outward from the lower base portion and a corner portion of said roof gusset which is formed between said lower end of the roof gusset and a gusset slant portion extending obliquely inward and upward toward said roof reinforcement from the lower end are arranged at the same level in a vehicle vertical direction.

14. The side vehicle-body structure of a vehicle of claim 1, wherein the lower end of the load transmission portion is connected to the upper end of said pillar inner portion and the outward face of the roof rail inner portion.

15. A side vehicle-body structure of a vehicle, comprising:
a pair of right-and-left roof rails extending in a vehicle longitudinal direction at an upper portion of a vehicle body, each of the roof rails being formed integrally by a roof rail outer portion provided on an outward side and a roof rail inner portion provided on an inward side;
a roof reinforcement extending in a vehicle width direction and connecting the pair of right-and-left roof rails;
a pair of right-and-left side sills extending in the vehicle longitudinal direction at a lower portion of the vehicle body; and
a center pillar connecting a central portion, the vehicle longitudinal direction, of each of the roof rails and a central portion, in the vehicle longitudinal direction, of each of the side sills, the center pillar being formed integrally by a pillar outer portion which is, connected to the roof rail outer portion of the roof rail at an upper end thereof and a pillar inner portion which is connected to the roof rail inner portion of the roof rail at an upper end thereof,
wherein a load transmission portion is provided at a position between said roof rail outer portion and said roof rail inner portion which is located substantially at the same longitudinal-position as the upper end of said pillar outer portion, an upper end of the load transmission portion being connected to an outward face of the roof rail inner portion, a lower end of the load transmission portion being connected to the upper end of said pillar inner portion or the outward face of the roof rail inner portion, the load transmission portion having a projection that projects outward toward the roof rail outer portion; and
the upper end of said pillar outer portion is connected to said roof rail outer portion substantially at the same position as an upper portion of said load transmission portion.

16. The side vehicle-body structure of a vehicle of claim 15, wherein the lower end of the load transmission portion is connected to the upper end of said pillar inner portion and the outward face of the roof rail inner portion.

17. A side vehicle-body structure of a vehicle, comprising:
a pair of right-end-left roof rails extending in a vehicle longitudinal direction at an upper portion of a vehicle body, each of the roof rails being formed integrally by a roof rail outer portion provided on an outward side and a roof rail inner portion provided on an inward side;
a roof reinforcement extending in a vehicle width direction and connecting the pair of right-and-left roof rails;
a pair of right-and-left side sills extending in the vehicle longitudinal direction at a lower portion of the vehicle body; and
a center pillar connecting a central portion, in the vehicle longitudinal direction, of each of the roof and a central portion, in the vehicle longitudinal direction, of each of the side sills, the center pillar being formed integrally by a pillar outer portion which is connected to the roof rail outer portion of the roof rail at an upper end thereof and a pillar inner portion which is connected to the roof rail inner portion of the roof rail at an upper end thereof,
wherein a load transmission portion is provided at a position between said roof rail outer portion and said roof rail inner portion which is located substantially at the sane longitudinal-position as the upper end of said pillar outer portion, an upper end of the load transmission portion being connected to an outward face of the roof rail inner portion, a lower end of the load transmission portion being connected to the outward face of the roof rail inner portion, the load transmission portion having a projection that projects outward toward the roof rail outer portion; and
said pillar inner portion and said load transmission portion are formed separately from each other, the load transmission portion is configured to have substantially a hat-shaped cross section and upper and lower base portions thereof, the upper and lower base portions of the load transmission portion being connected to said roof rail inner portion.

18. The side vehicle-body structure of a vehicle of claim 17, wherein said roof reinforcement is connected to said n f rail at substantially at the same longitudinal-position as an upper end of said center pillar, a roof gusset which connects the roof reinforcement and the center pillar is provided, three members of said lower base portion of the load transmission portion, said roof rail inner portion, and a lower end of said roof gusset are overlapped and joined together, and a corner portion of said load transmission portion which is formed between said lower base portion and a side wall portion extending outward from the lower base portion and a corner portion of said roof gusset which is formed between said lower end of the roof gusset and a gusset slant portion extending obliquely inward and upward toward said roof reinforcement from the lower end are arranged at the same level in a vehicle vertical direction.

19. The side vehicle-body structure of a vehicle of claim 18, wherein protrusion portions which protrude in a vehicle vertical direction are formed at part of corner portions of said load transmission portion which are formed between said base portions and side wall portions extending outward from the base portions.

20. The side vehicle-body structure of a vehicle of claim 17, wherein a corner portion of said load transmission portion which is formed between said lower base portion and a side wall portion extending outward from the lower base portion and a corner portion of said roof gusset which is formed between said lower end of the roof gusset and a gusset slant portion extending obliquely inward and upward toward said roof reinforcement from the lower end are arranged at the same level in a vehicle vertical direction.

* * * * *